United States Patent [19]

Coleman

[11] Patent Number: 4,792,281

[45] Date of Patent: Dec. 20, 1988

[54] WIND TURBINE PITCH CONTROL HUB

[75] Inventor: Clint Coleman, Warren, Vt.

[73] Assignee: Northern Power Systems, Inc., Moretown, Vt.

[21] Appl. No.: 926,463

[22] Filed: Nov. 3, 1986

[51] Int. Cl.[4] .................................................. F03D 7/04
[52] U.S. Cl. ..................................... 416/156; 416/135; 416/148; 416/158
[58] Field of Search ....................... 416/202, 156, 43 A, 416/137, 132 B, 135 A, 136 R, 136 A, 158, 41 A, 212 R, 102, 148

[56] References Cited

U.S. PATENT DOCUMENTS

| | | | |
|---|---|---|---|
| 1,803,858 | 5/1931 | MacClatchie | 416/156 |
| 1,947,365 | 2/1934 | Thompson | 416/202 X |
| 1,973,355 | 9/1934 | O'Bryan | 416/202 X |
| 2,043,136 | 6/1936 | Weible | 416/202 X |
| 2,196,573 | 4/1940 | Wiste | 416/202 X |
| 2,215,456 | 9/1940 | Albers | 416/41 A X |
| 2,253,013 | 8/1941 | Birch | 416/202 X |
| 2,284,521 | 5/1942 | Insua | 416/139 A X |
| 2,639,775 | 5/1953 | Hunt | 416/148 |
| 2,702,602 | 2/1955 | Van Ommeren | 416/158 |
| 2,949,965 | 8/1960 | DeTore et al. | 416/102 X |
| 3,380,535 | 4/1968 | Biermann | 416/136 X |
| 3,393,750 | 7/1968 | You | 416/158 X |
| 3,807,896 | 4/1974 | Johnson | 416/102 |
| 4,201,514 | 5/1980 | Huetter | 416/132 B X |
| 4,274,807 | 6/1981 | Kenney | 416/135 A X |
| 4,435,646 | 3/1984 | Coleman et al. | 416/11 X |

FOREIGN PATENT DOCUMENTS

| | | | |
|---|---|---|---|
| 2529 | 6/1932 | Australia | 416/135 A |
| 1190478 | 7/1985 | Canada | 416/43 A |
| 734147 | 4/1943 | Fed. Rep. of Germany | 416/136 |
| 2834786 | 2/1980 | Fed. Rep. of Germany | 416/102 |
| 1149452 | 12/1957 | France | 416/135 A |
| 93972 | 5/1984 | Japan | 416/43 A |
| 114637 | 7/1945 | Sweden | 416/41 A |
| 222336 | 10/1942 | Switzerland | 416/137 |
| 225848 | 6/1943 | Switzerland | 416/202 |
| 229023 | 12/1943 | Switzerland | 416/202 |
| 772908 | 4/1957 | United Kingdom | 416/136 |

*Primary Examiner*—Everette A. Powell, Jr.
*Attorney, Agent, or Firm*—Fish & Richardson

[57] ABSTRACT

In a variable pitch wind turbine system, pitch angle is determined by a pneumatically pressurized hydraulic actuator connected between crank arms on the blade pitch axles. The hydraulic line extends coaxially through the rotor drive shaft via a rotary union to a gas charged accumulator on the yaw carriage. The pitch axes are positively coupled for 1:1 counter-rotation by a gear train, preferably lying on the opposite side of the rotor axis from the hydraulic actuator.

2 Claims, 5 Drawing Sheets

FIG. 2
RUN POSITION

FIG. 1
RUN POSITION

FIG. 3
RUN POSITION

FIG. 4
SHUTDOWN POSITION

WIND TURBINE PITCH CONTROL HUB

CROSS-REFERENCE TO RELATED APPLICATION

This application is related to U.S. Pat. No. 4,435,646, entitled "Wind Turbine Rotor Control System" (hereinafter "the '646 patent"), issued Mar. 6, 1984 to North Wind Power Company, Inc., the former name of the assignee of the present application, and incorporated herein by reference.

BACKGROUND OF THE INVENTION

The invention relates generally to wind turbine rotor control systems, and more particularly, to automatic blade pitch control systems for wind turbines employed as electrical generators connected to the electrical grid.

Blade angle or pitch can be controlled to regulate output torque. The '646 patent discloses an all-mechanical system in which blade loading or blade moment automatically controls rotor pitch via a rotary control linkage having a spring biasing mechanism connected to the carriage. The blade load provides the forcing function to the control mechanism in an inherent closed loop whose transfer function in effect can be tailored by cam design, for example, to maximize output power over a design range of wind speeds. Passive, all-mechanical systems are particularly desirable because they are inherently fast reacting and reliable due to their relative invulnerability to environmental factors.

The linkage design of the '646 patent is particularly suitable for wind turbines for remote power applications with little or no servicing. However, the design is not optimal for wind farm applications involving larger routinely serviced machines.

SUMMARY OF THE INVENTION

The general object of the invention therefore is to control output torque in a variable pitch wind turbine by means of a reliable dynamic mechanical system for automatically controlling the pitch of the blades as a function of blade moment due to wind loads and centrifugal inputs.

According to the invention, in a passive pitch control system for a twin bladed rotor, parallel pitch axles of the two blades are direct coupled via a gear train. Pitch angle is determined by a pneumatically pressurized hydraulic linear actuator connected between crank arms on the two blade axles. The hydraulic line extends coaxially through the rotor drive shaft via a rotary union to a gas-charged accumulator.

In the preferred configuration for an upwind, stable yaw wind turbine with a teetering hub, parallel blade pitch axes define a rotor plane transverse to the rotor drive axis which intersects the rotor plane midway between the pitch axes. Blade pitch axles coaxial with the respective pitch axes are journalled in a hub housing. The ends of the blade axles overlap each other over a substantial distance. In the preferred embodiment a gear train links the two axles on one side of the rotor axis. On the other side a linear actuator is connected between the crank arms on the axles. The actuator preferably acts in parallel to the gear train. The collapsible hydraulic linkage and "pneumatic spring" between the blade pitching axles provide direct override capability for manual as well as automatic shutdown via blade feathering.

DESCRIPTION OF THE PREFERRED EMBODIMENTS

Figures 1, 2:
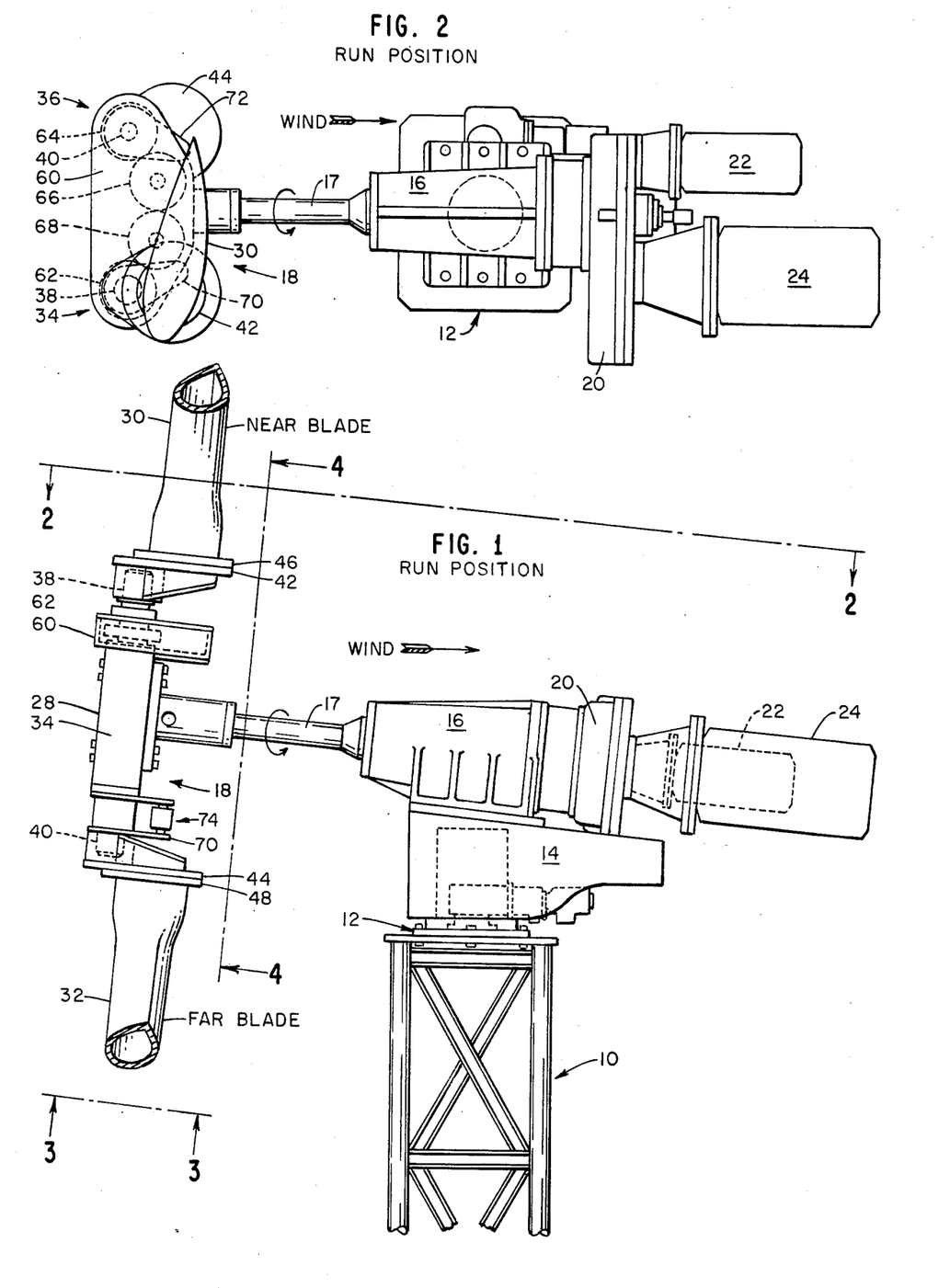
FIG. 1 is a side elevational view of a tower mounted twin bladed upwind turbine with a pitch control rotor hub in run condition, according to the invention.
FIG. 2 is a top plan view of the wind turbine taken along lines 2—2 of FIG. 1.

FIG. 1 illustrates an installation for an upwind, stable yaw, two-bladed wind turbine for generating electricity for synchronous interconnection with the electrical utility grid. A tower 10 supports a horizontal turntable assembly 12 about 70 feet above the ground. Mounted on the turntable assembly 12 is a carriage 14 rotatable in the yaw direction about the vertical axis of the turntable assembly 12. The carriage 14 carries a drive shaft housing 16 in which a high torque hollow drive shaft 17 is journalled.

A twin-bladed rotor 18 is connected to the forward end of the drive shaft and the rearward end of the drive shaft is connected via gear box 20 to a pair of induction generators 22 and 24 optimized for performance at low and high wind conditions, respectively, thus allowing the rotor to turn at its best operating speed at two corresponding design points. Overrunning sprag clutches (not shown) on the gear box output shafts reduce the number of power train control cycles and relay closures thereby increasing overall equipment life and reducing maintenance. One way sprag clutches improve alternator/grid connection an disconnection.

Figure 4:
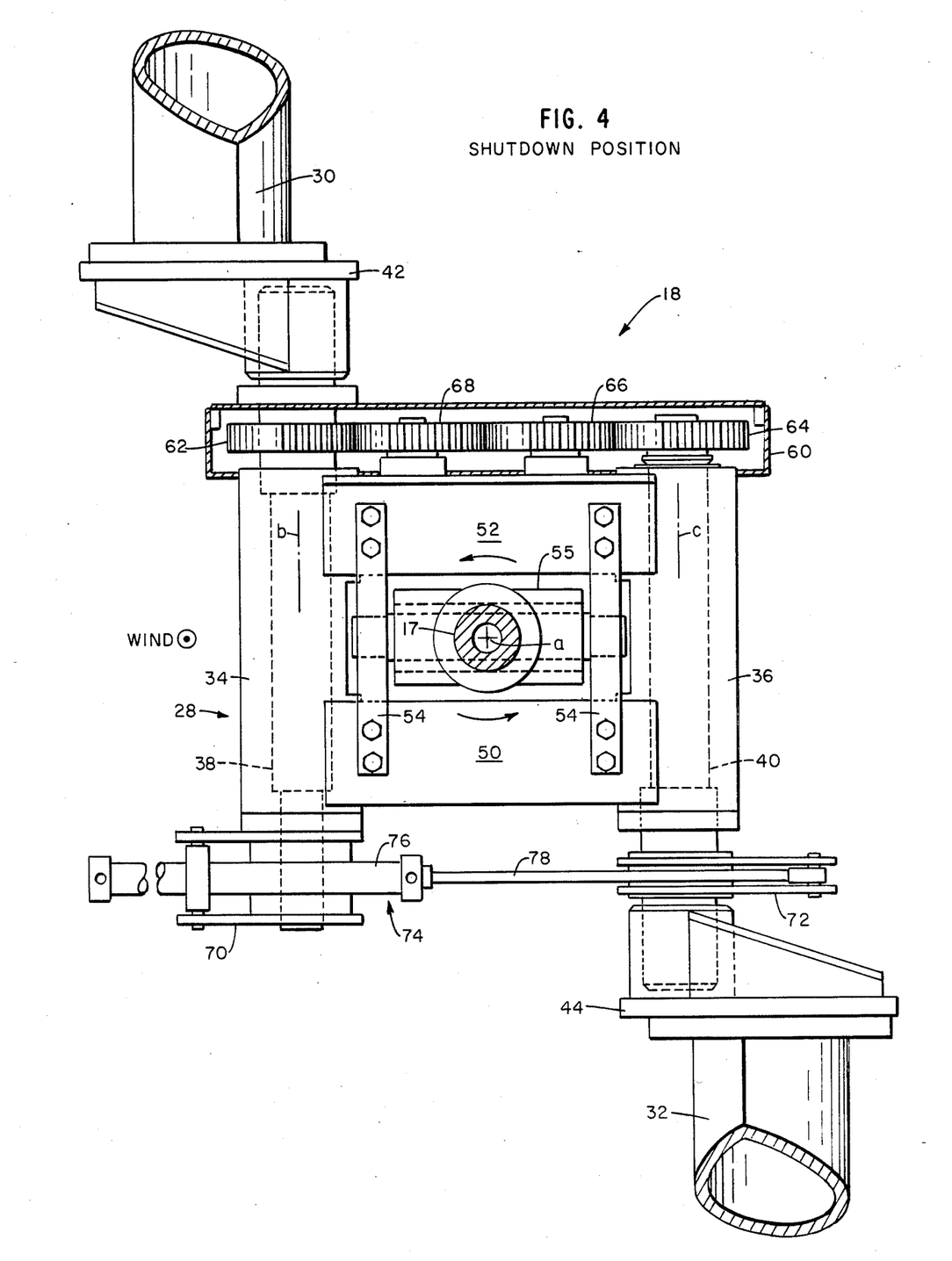
FIG. 4 is a sectional shaft end view of the hub taken along lines 4—4 of FIG. 1.

The rotor 18 includes a generally rectangular hub 28, as shown in FIG. 4, mounted for rotation on the drive axis a. The hub 28 carries a pair of identical wind turbine blades 30 and 32. For a 100 kw rated design, the rotor blades have a diameter of approximately 58 feet. The blades ideally have a zero degree coning angle and are equipped with an elastomeric teetering hub. An example of a teetering hub is shown in FIG. 6 of the '646 patent. The rotor is designed for two speed operation (48/72 RPM) and should be self starting at about 7 miles per hour. The design tip speed ratio is 7-9.

Figure 3:
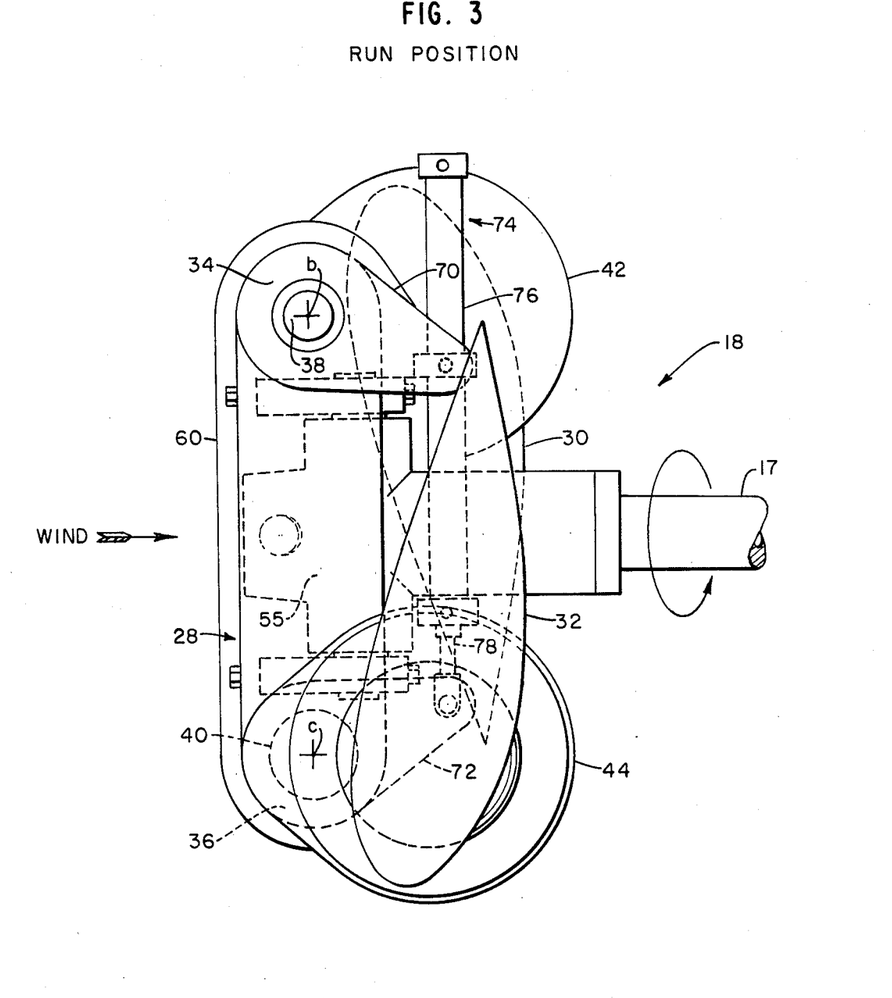
FIG. 3 is a bottom plan view of the rotor hub taken along lines 3—3 of FIG. 1.

Hub 28 is shown in more detail in FIGS. 2-4. The hub 28 comprises a pair of parallel spaced cylindrical bearings 34 and 36 in which blade axles 38 and 40 respectively are journaled for rotation. The cylindrical bearings 34 add 36 define blade pitch axes b and c respectively. Eccentric circular mounting flanges 42 and 44 are connected to opposite ends of the blade pitch axles 38 and 40, respectively. Blades 30 and 32 (FIG. 1) have mating flanges 46 and 48 adapted to be bolted to the mounting flanges 42 and 4 respectively.

Bearing cylinders 34 and 36 are held together by means of box tube cross braces 50 and 52 welded to the cylinders 34 and 36 to form a strong rigid square frame. The rotor axle 17 is connected to the hub as shown in FIGS. 3 and 4. Mounting brackets 54 rigidly interconnect the teetering hub assembly 55 to the box tubes 50 and 52. A gear case 60 spans corresponding ends of the bearing cylinders 34 and 36. A set of four spur gears 60' are rotatably mounted within the gear case as shown in FIGS. 1 and 4. The gear pitch diameter of a prototype is 9 inches. Two drive gears 62 and 64 are mounted coaxially on the pitch axles 38 and 40. The eccentric mounting flange 42 is connected to the spur gear 62. The two axle gears 62 and 64 are drivingly interconnected by means of a pair of transmission gears 66 and 68 having axles journaled within the gear case 60 offset from the plane defined by the pitch axes b and c as shown in FIG. 4.

At the other end of the bearing cylinders 34 and 36, the axes are interconnected by means of a rotational bias assembly including a pair of similarly oriented bell cranks 70 and 72 rigidly connected to the pitch axles 38 and 40 respectively. Bell crank 72 can be integrally cast with the eccentric mounting flange 44 if desired. The outer ends of the bell cranks 70 and 72 are pivotally connected to a linear hydraulic actuator 74 comprising a cylinder 76 pivotally connected to bell crank 70 and a piston rod 78 slidably received within the cylinder and pivotally connected to bell crank 72. Ideally, to make the design as compact as possible, the bell cranks extend toward the axis of the circular mounting flange in the same direction as the raised central portion of the gear case. 60 as shown in FIG. 2. Linear actuator 74 may be equipped with a spring bias assist if desired.

Figure 5:
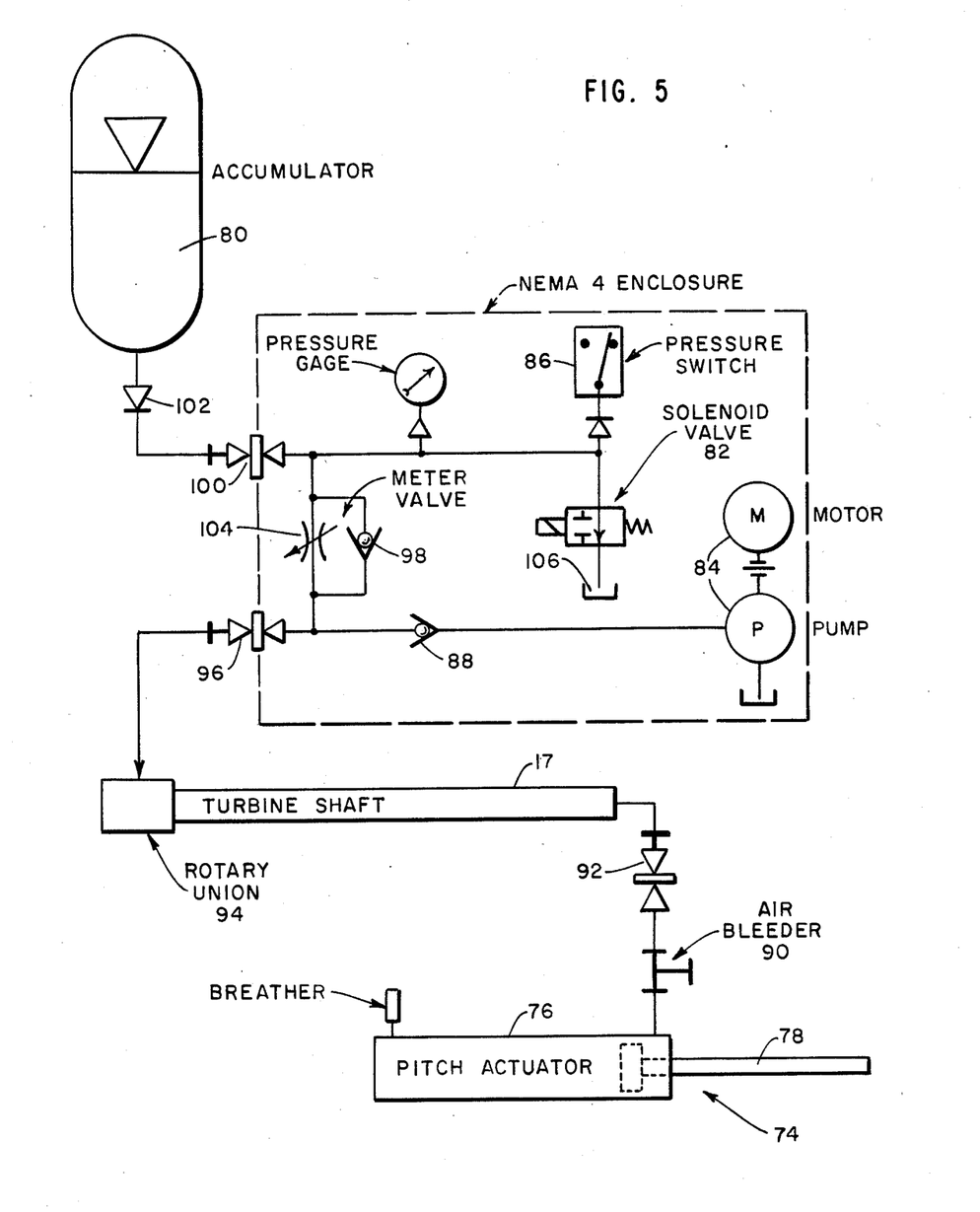
FIG. 5 is a schematic diagram of the hydraulic system.

The hydraulic system is diagrammed in FIG. 5. The hydraulic line extends coaxially through the rotor drive shaft toward the gear box 20 and is connected via a rotary union to a pneumatically pressurized accumulator and other components mounted in the yaw carriage 14 as shown in FIG. 5. Turning the valve to the off condition vents hydraulic fluid freely to the sump allowing centrifugal forces to fully feather the blades.

The hydraulic system of FIG. 5 is used to control the pitch actuator 74 to pitch both blades through about 70° between full feather and run. In operation, the pitch moments due to centrifugal force and aerodynamic loading on the blades tend to draw the piston rod out of the cylinder. This moment increases with wind speed and it is in the direction of the wind. A gas-charged bladder-type accumulator 80 absorbs the fluid forced out of the cylinder as a result of the pitch moment as the piston rods 78 is extended. The gas-charged bladder acts as a spring to absorb the force in these aerodynamic moments thereby providing an increasing countermoment to return the blades to the run position.

Certain components of the hydraulic system are housed in a NEMA 4 enclosure as shown in FIG. 5.

The system operates in four different modes:
A. pressurizing start sequence;
B. pitch toward feather under load;
C. pitch toward run when unloading;
D. rapid feathering (commanded shutdown).

When energized, the shutdown valve 82 closes and the motorized pump 84 is activated to charge the system up to operating pressure. The gas spring pressure and fluid volume are balanced in the accumulator 80 and cylinder 76 is fully retracted to the start position (opposite to the run position shown in FIG. 5). When operating pressure is attained, the pump 84 is deactivated via pressure switch 86. The pump will come on as necessary to maintain system pressure as dictated by the pressure switch range. When the pump is off, however, check valve 88 isolates it from the hydraulic system.

In mode B (pitch toward feather under load), increasing centrifugal and aerodynamic pitch moments during turbine operation during increasing wind speed will tend to draw the piston rod 78 out of the cylinder 76. The fluid displaced from the cylinder will be absorbed into the accumulator 80 via the hydraulic line comprising air bleeder 90, quick disconnect 92, the hydraulic line running through the turbine shaft 17 and rotary union 94, quick disconnect 96, check valve 98, quick disconnect 100 and reducer 102. The increase of fluid volume will increase the gas spring pressure in the accumulator 80 as well as the system pressure. The accumulator is sized to absorb the volume associated with maximum system pressure. Fluid flowing from the cylinder to the accumulator tends to feather the rotor blades.

In mode C (pitch toward run as blades unload), the hydraulic fluid flow is in the opposite direction. As the pitching moment on the blades is reduced by a decrease in wind speed, a control force is provided by the gas spring in the accumulator 80 to return the actuator 74 to the run position. This control force was stored by spring compression during mode B. As the spring moves back toward its equilibrium mode, fluid is displaced from the accumulator to the actuator via the same hydraulic path including valve 104 instead of check valve 98.

Modes B and C will occur frequently during turbine operation. Due to losses in stored energy through flow friction and actuator friction, the pump will energize as necessary to maintain system pressure.

Mode D (rapid feathering for shutdown), is accomplished by venting the hydraulic fluid to reservoir 106 by de-energizing solenoid valve 82. Fluid from the cylinder 76 is dumped to the reservoir by centrifugal or aerodynamic feathering moment via check valve 98 through the solenoid valve 82. Flow from the accumulator is also directed to the reservoir. Pump 84 has t be reactivated to repressurize the system after shutdown.

Increasing wind loadings on the blades give rise to blade moments which torque the pitch axles. This increasing torque faces progressive resistance from the linear actuator 74. The higher the wind loading, the higher the blade control moment and the more feathered the blades become.

Figure 6:
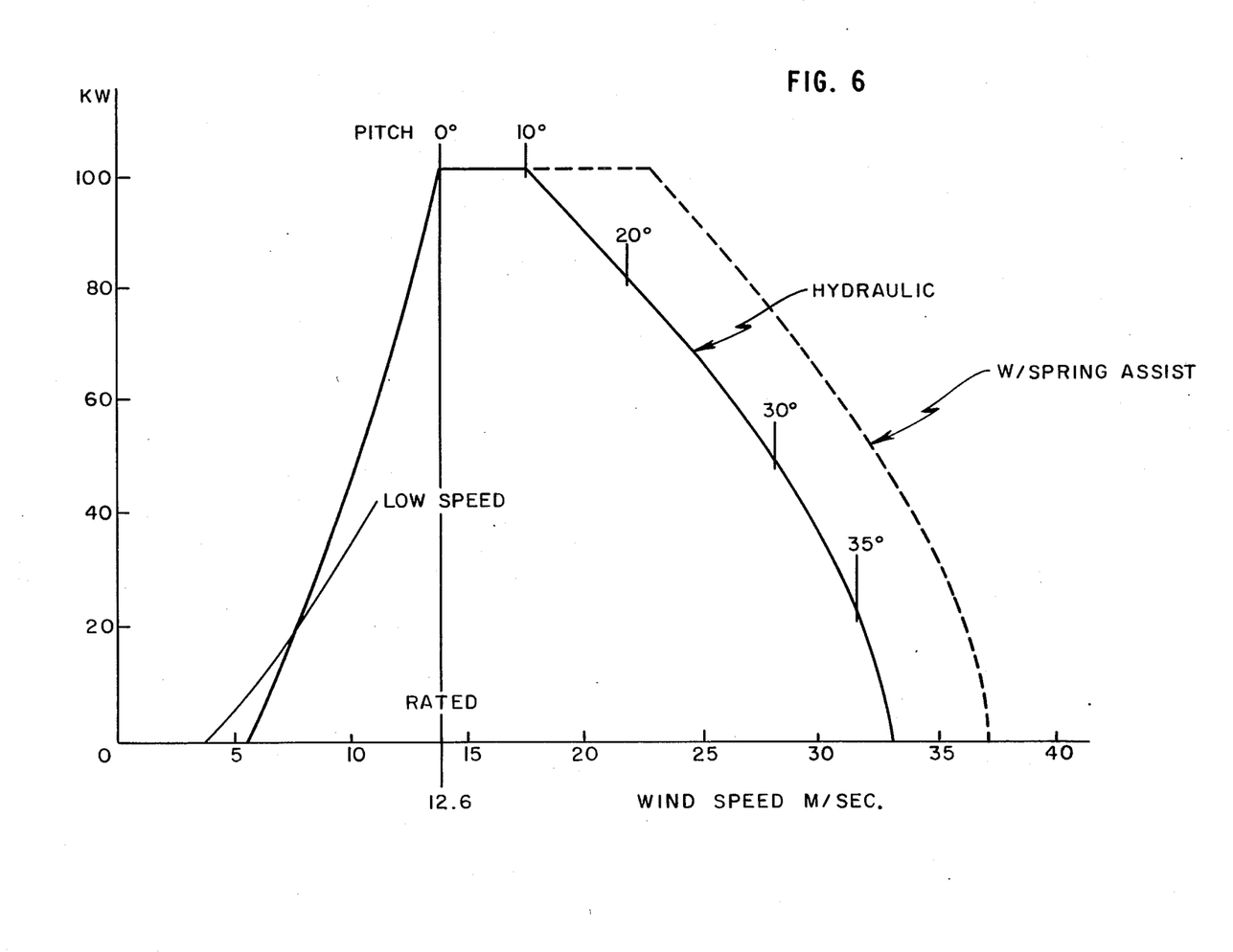
FIG. 6 is a graph of predicted power versus wind speed for a wind turbine equipped with a pitch control hub according to the invention.

As shown in the graph of FIG. 6 of the present application, the resulting power curve spans a range of wind speeds from 7 to over 30 m.p.h. The operating envelope can be stretched with the addition of a spring assist in the linear actuator 74. The shape of the curve, maximum power output plateau, and the power rolloff to shut down are determined by a pitch variation schedule with wind speed. The dual rolloff curve illustrates the design latitude of the passive control which can use either hydraulic or combination spring bias assist in the load control region. Approximate passive blade pitch angles are shown in the graph.

The blade pitch controller is a passive mechanical device which allows the blades to seek their own equilibrium position in the pitching degree of freedom as conditions change. Several pitching moments combine to determine the equilibrium pitch schedule for the rotor. Blade air foil, blade thrust offset and blade centrifugal offset produce pitching moments in turn determines the power curve characteristic. The magnitudes and variations of the individual moments can be modified by judicious placement of the blade mass axis, control axis and aerodynamic axis offsets. The Euler angles of the blade axis, in sweep and coning, are also important in the analysis as are the teeter dynamic feedback angles delta 1 and delta 3.

This all passive rotor control system utilizes the wind forces and inertial forces already inherent in the blades to automatically change the rotor pitch to protect the turbine in wind gusts, high winds and loss of load. The rotor pitch can be tuned to maximize the power curve for a particular site by selection of the proper pneumatic spring. The level of reliability and safety offered by the automatic rotor hub eliminates the need for a brake and provides for manual operating capability to full feathering.

A 100 kw wind turbine system prototype designed to take advantage of the pitch control hub disclosed herein has the following additional mechanical specifications:

Gear box 20:
    25:1 and 37.5:1 ratios for the two outputs,
    95% full load efficiency
    low starting torque
    first stage planetary
    second stage helical with dual output
    one way sprag clutch on output
    double sealed construction
    continuous oil lubricated bearings Generators:

| Size | 100 kw | 20 kw |
|---|---|---|
| Speed | 1800 RPM | 1800 RPM |
| Type | induction 480 VAC | induction 480 VAC |
| Power Factor | .95 | .85 |
| Efficiency | 94% | 91% |
| Frame | 405 TD dripproof | 284 TD dripproof |
| Construction | Class H | Class H |

Yaw Drive:
    4 degrees/sec driven yaw rate
    coasting design with overdrive
    800:1 gear ratio
    ½ HP reversible induction motor Gears 62 and 64 on the pitch axles are preferably hard heat treated gears with an AGMA tolerance rating of 11. These gears are preferably heat shrunk onto the pitch axles and the mounting flanges for the rotor blades are adjustably mounted to the gear/axle by means of conical clamps (not shown), which can be loosened to allow the blades to be "timed" to within one-tenth of a degree and retightened. The idler gears can be pulled and rotated to engage fresh teeth. Because the idler gears can be replaced, they can be made of softer metal than the end gears to accommodate wear. For adjustment, it may be desirable to mount the idler gears on eccentrics.

This hub design handles extreme cyclical loads for two bladed wind turbines in the medium size range from 50 to 80 feet in diameter. Blade weight increases as the cube of the radius. Gravity loads the hub and blades differently depending on orientation of the blades as they rotate about the rotor axis. Moreover, because the mass center of the blades is behind the pitch axis, gravity terms have a secondary angle-dependent cyclical effect on the pitch angle. This cyclical loading and unloading is withstood by the rigid frame hub design.

The centrifugal term proportional to the square of the angular velocity is by design more significant than the aerodynamic term so as to allow rpm to be reflected in the blade pitch moment.

If desired, a plurality of accumulators with different pressures with one or more actuators can be used to handle different load regimes. The single actuator/single accumulator, however, represents an elegant all-in-one pitch control design.

In addition to normal operation as shown in FIG. 6, wind gusts and loss of electrical load are also compensated for by the pitch control hub. Wind gusts are reacted on the blades as an increase in nose down pitching moment by virtue of the control axis offset. This results in a corresponding immediate pitch angle change, modified by blade inertia, which relieves the blade bending moment. Instead of producing a high torque peak and transient blade bending moment, the passive spring arrangement of the pitch control hub allows attenuation with corresponding passive gust loading relief.

With loss of load comes corresponding rotor overspeed. The passive rotor design also controls to within safe limits loss of load due to overspeed. Finally, utilizing the passive pitch control hub eliminates the need for complicated electronic control logic, interactive sensors and feedback loops with difficult diagnostics and operational procedures. The use of a collapsible hydraulic linkage between the blade pitching loads and the pneumatic spring provides direct and effective override capability to further enhance the reliability of the system. By providing both automatic and manual shutdown functions via blade feathering, no additional brakes or control elements are required.

The foregoing embodiments are intended to be illustrative rather than restrictive. Many variations, additions or subtractions from the system as disclosed are possible without departing from the principles and spirit of the invention. For example, the drive train of spur gears 60' can be modified as desired to produce directly coupled counter-rotation of the blades. Moreover, the location of the gear train and linear actuator along the pitch axes b and c can be modified. Given sufficient space, the drive train could be located elsewhere, for in the center of the hub, with one (as shown) or more linear actuators connected to the bell crank on the blade axle ends protruding from the bearing cylinders. Other modifications can be made to the hydraulic system. For example, a double acting cylinder can be used t permit the blades to be positively driven to full feather, if desired. In any event, the scope of the invention is indicated by the appended claims and equivalents thereto.

What is claimed is:

1. A variable pitch control wind turbine hub comprising
    a housing defining a pair of parallel, spaced blade pitch axis in a plane intersected by the rotor axis approximately midway between said pitch axes,
    a pair of blade axles journalled in said housing for at least partial rotation about the respective pitch axes,
    a gear train connected transversely between said pitch axes for directly coupling said blade axles for counterrotation to carry the blade cyclic loads and make the pitch angles of both blades interdependent,
    each blade axle having a radially extending crank arm,
    a linear actuator interconnecting said crank arms for controllably varying the relative displacement as a function of blade loading and having a cylinder pivotally connected to one crank arm and a piston rod pivotally connected to the other crank arm, said linear actuator being separate from and not acting directly on said gear train, for biasing said blade axles to a nominal starting pitch angle and for carrying the blade collective loads for positively determining pitch angle in operation,
a pair of circular blade mounting flanges each defining a blade mounting flange plane, and
means for connecting each mounting flange eccentrically to the respective blade axle such that the flange plane is transverse to the pitch axis with the center of the blade flange offset therefrom.

2. The hub of claim 1, wherein the blade mounting flanges are offset in the same direction and the crank arms extend generally toward the axis of the respective blade flanges.

* * * * *

UNITED STATES PATENT AND TRADEMARK OFFICE
CERTIFICATE OF CORRECTION

PATENT NO. : 4,792,281

DATED : December 20, 1988

INVENTOR(S) : Clint Coleman

It is certified that error appears in the above-identified patent and that said Letters Patent is hereby corrected as shown below:

Column 2, line 41, "an" should be --and--.
Column 2, line 62, "4" should be --44--.
Column 4, line 37, "t" should be --to--.
Column 4, line 63, "trifugal offset produce pitching moments in turn deter-" should be --trifugal offset produce pitching moments whose vector sum determines the equilibrium pitch schedule which in turn deter---.
Column 6, line 40, "in the center of the hub, with one (as shown) or more" should be --example, in the center of the hub, with one (as shown) or more--.
Column 6, line 44, "t" should be --to--.

Signed and Sealed this

Twentieth Day of June, 1989

Attest:

DONALD J. QUIGG

*Attesting Officer*      *Commissioner of Patents and Trademarks*